(12) United States Patent
Furuya et al.

(10) Patent No.: US 7,233,082 B2
(45) Date of Patent: Jun. 19, 2007

(54) INTERCONNECTING POWER GENERATION SYSTEM

(75) Inventors: Tai Furuya, Tokyo (JP); Tadashi Kataoka, Tokyo (JP); Terence McKelvey, Tokyo (JP); Eishi Marui, Tokyo (JP); Motoyasu Sato, Fujisawa (JP); Takahide Ozawa, Fujisawa (JP); Shaojun Zheng, Fujisawa (JP); Seiichi Ishihara, Fujisawa (JP); Noboru Kinoshita, Fujisawa (JP)

(73) Assignee: Ebara Densan Ltd., Tokyo (JP)

( * ) Notice: Subject to any disclaimer, the term of this patent is extended or adjusted under 35 U.S.C. 154(b) by 547 days.

(21) Appl. No.: 10/731,879

(22) Filed: Dec. 9, 2003

(65) Prior Publication Data

US 2004/0264089 A1 Dec. 30, 2004

(30) Foreign Application Priority Data

Dec. 10, 2002 (JP) ............................. 2002-357778

(51) Int. Cl.
*H02J 7/00* (2006.01)
*H02J 9/00* (2006.01)

(52) U.S. Cl. ...................................... 307/64
(58) Field of Classification Search .................. 307/64
See application file for complete search history.

(56) References Cited

U.S. PATENT DOCUMENTS 5,798,631 A * 8/1998 Spee et al. ..................... 322/25
6,411,065 B1 * 6/2002 Underwood et al. .......... 322/20
6,487,096 B1 * 11/2002 Gilbreth et al. ............... 363/35
2002/0060556 A1 5/2002 Wall

FOREIGN PATENT DOCUMENTS

| JP | 6-38696 | 4/1989 |
|---|---|---|
| JP | 3142029 | 4/1994 |
| JP | 3127250 | 1/1995 |
| WO | PCT/JP2003/010564 | 8/2002 |

* cited by examiner

Primary Examiner—Stephen W. Jackson
Assistant Examiner—Carlos Amaya
(74) Attorney, Agent, or Firm—The Webb Law Firm

(57) ABSTRACT

To provide an interconnecting power generation system which can detect an abnormality in the utility power supply and can be isolated from a utility power system and can prevent damage to a turbogenerator.

An interconnecting power generation system comprises: an interconnecting inverter 14; a voltage phase shift circuit 20 which synchronizes the output voltage phase of the interconnecting inverter 14 with the utility power voltage phase and monitors zero crossings of the utility power voltage, and which shifts the output voltage phase from the utility power voltage phase and shifts the shifted output voltage phase to the utility power voltage phase; a phase comparator 24 for comparing the voltage phase of the utility power system 10 and the output voltage phase of the interconnecting inverter; and an interconnection control unit 30 which detects a power outage caused by an interruption of power supply from the utility power system 10 based on a series of a predetermined number of matching signals outputted from the phase comparator 24 and sends a control signal to a circuit breaker 22 to shut off the output of the interconnecting inverter 14 from the utility power system 10.

6 Claims, 6 Drawing Sheets

INTERCONNECTING POWER GENERATION SYSTEM

BACKGROUND OF THE INVENTION

1. Field of the Invention

This invention relates to an interconnecting power generation system and, more particularly, to an interconnecting power generation system for supplying electrical power to an interconnecting load in conjunction with a utility power system.

2. Description of the Related Art

In general, an interconnecting power generation system comprises an inverter apparatus for converting a DC output of a solar power generation system for example as a DC power source into an AC output and linking the DC power source to an AC utility power supply. A control unit for controlling the inverter apparatus has a detection circuit for detecting the phase voltage of the utility power supply, a detection circuit for detecting the output current of the inverter apparatus, an arithmetic circuit for calculating the error between signals indicating the phase voltage of the utility power supply and the output current of the inverter apparatus detected by the respective detection circuits, and a driver circuit for controlling the switching of the inverter apparatus based on the output of the arithmetic circuit, and makes the output current outputted from the current-controlled inverter apparatus follow the phase voltage signal of the utility power supply so that a sine wave current coincident in phase with the voltage of the utility power supply can be outputted. The interconnecting power generation system thereby converts electrical power generated by a solar cell into AC electrical power for example.

However, in order to interrupt power supply in a utility power system intentionally for maintenance or inspection, a switch upstream of the power outage section must be opened to interrupt the power supply to the section. When an interconnecting power generation system described as above is installed in or connected to the power outage section, it is necessary to detect the power outage and open a switch interposed between the interconnecting power generation system and the utility power system to isolate the interconnecting power generation system from the utility power system.

When an abnormality in the utility power supply such as an over-frequency or under-frequency condition is detected, the interconnecting power generation system must be isolated from the utility power system by opening the switch.

Moreover, in an interconnecting power generation system comprising a turbogenerator, at the moment when the interconnecting power generation system is isolated from the utility power system, the generator is put into a no-load operating condition to the rotational speed of the turbine rapidly increase to exceed the absolute rated speed, resulting in damage to the turbine or the auxiliaries.

The present invention has been made in view of the above circumstances and it is, therefore, an object of the present invention to provide an interconnecting power generation system which can detect an abnormality in the utility power supply and can be isolated from the utility power system and can prevent damage to a turbogenerator.

SUMMARY OF THE INVENTION

To achieve the above object, according to a first aspect of the invention, as shown for example in FIG. 1, there is provided an interconnecting power generation system 1 connected in parallel to a utility power system 10 for supplying electrical power to an interconnecting load 12, comprising: an interconnecting inverter 14 for linking generated electrical power to the utility power system 10; a voltage phase shift circuit 20 which synchronizes the output voltage phase of the interconnecting inverter 14 with the utility power voltage phase and monitors zero crossings of the utility power voltage, namely points at which the utility power voltage (alternating voltage waveform) crosses the zero-volt line, and which, when a predetermined number of zero crossings have been detected or when a zero crossing of the utility power voltage is detected after an internal timer has reached a predetermined period of time, with the zero crossing timing as a starting point, shifts the output voltage phase from the utility power voltage phase during one cycle and shifts the shifted output voltage phase to the utility power voltage phase during the following cycle; a circuit breaker 22 for shutting off the output of the interconnecting inverter 14 from the utility power system 10; a phase comparator 24 for comparing the voltage phase of the utility power system 10 and the output voltage phase of said interconnecting inverter 14; and an interconnection control unit 30 which detects a power outage caused by an interruption of power supply from the utility power system 10 based on a series of a predetermined number of matching signals outputted from the phase comparator 24 and sends a control signal to the circuit breaker 22 to shut off the output of the interconnecting inverter 14 from the utility power system 10. Further, the phase is shifted reliably for a period of two cycles of an advanced phase and a delayed phase, with the zero crossing timing as a starting point. Thus, when a power outage in the utility power system occurs, for example, in contrast to the case where the phase is shifted to be advanced only for one cycle, which may result in the phase not to be shifted if the phase is oppositely shifted to be delayed according to the load condition and may result in the inability to detect the power outage, the interconnection control unit 30 can detect the power outage irrespective of the load condition using the comparison result of the phases during the period of two cycles of the advanced phase and the delayed phase. Namely, the interconnection control unit 30 can detect certainly the power outage in the second cycle even if the phase is delayed according to the load condition.

In the interconnecting power generation system configured in this way, the interconnection control unit 30 can detect a power outage caused by an interruption of power supply from the utility power system 10 based on a series of the predetermined number of matching signals outputted from the phase comparator 24 and send a control signal to the circuit breaker 22 to shut off the output of the interconnecting inverter 14 from the utility power system 10.

To achieve the above object, according to a preferred embodiment of the first aspect, there is provided an, wherein, as shown for example in FIG. 1, when no matching signal is outputted from the phase comparator 24 within a period during which the output voltage phase is to be matched with the utility power voltage phase, the interconnection control unit 30 detects variations in the frequency of the utility power system 10 and sends a control signal to the circuit breaker 22 to shut off the output of the interconnecting inverter 14 from the utility power system 10.

In the interconnecting power generation system configured in this way, the interconnection control unit 30 can detect variations in the frequency of the utility power system 10 and can shut off the output of the interconnecting inverter from the utility power system 10 by sending a control signal to the circuit breaker 22.

To achieve the above object, according to a second aspect of the invention, as shown for example in FIG. 1, there is provided an interconnecting power generation system 1 connected in parallel to a utility power system 10 and for supplying electrical power to an interconnecting load 12, comprising: a turbogenerator 32 for generating electrical power, an interconnecting inverter 14 for linking electrical power generated by the turbogenerator 32 to the utility power system 10; a voltage phase shift circuit 20 which synchronizes the output voltage phase of the interconnecting inverter 14 with the utility power voltage phase and monitors zero crossings of the utility power voltage, and which, when a predetermined number of zero crossings have been detected, shifts the output voltage phase from the utility power voltage phase during one cycle and shifts the shifted output voltage phase to the utility power voltage phase during the following cycle; a circuit breaker 22 for shutting off the output of the interconnecting inverter 14 from the utility power system 10; a phase comparator 24 for comparing the voltage phase of the utility power system 10 and the output voltage phase of the interconnecting inverter; and an interconnection control unit 30 which detects a power outage caused by an interruption of power supply from the utility power system 10 based on a series of a predetermined number of matching signals outputted from the phase comparator 24 and sends a control signal to the circuit breaker 22 to shut off the output of the interconnecting inverter 14 from the utility power system 10, and which decreases the rotational speed of the turbogenerator 32 to a predetermined speed during the period between the detection of the power outage and the shutoff of the utility power system 10.

In the interconnecting power generation system configured in this way, the interconnection control unit 30 can detect a power outage caused by an interruption of power supply from the utility power system 10 based on a series of the predetermined number of matching signals outputted from the phase comparator 24 and send a control signal to the circuit breaker 22 to shut off the output of the interconnecting inverter 14 from the utility power system 10, and can decrease the rotational speed of the turbogenerator 32 to the predetermined speed during the period between the detection of the power outage and the shutoff of the utility power system 10.

To achieve the above object, according to a preferred embodiment of the second aspect, there is provided an interconnecting power generation system 1, wherein, as shown for example in FIG. 1, the turbogenerator 32 recharges a battery 38 within the predetermined period of time in response to the shutoff command.

To achieve the above object, according to a third aspect of the invention, as shown for example in FIG. 1, there is provided an interconnecting power generation system 1 connected in parallel to a utility power system 10 and for supplying electrical power to an interconnecting load 12, comprising: a turbogenerator 32 for generating electrical power, an interconnecting inverter 14 for linking electrical power generated by the turbogenerator 32 to the utility power system 10; a voltage phase shift circuit 20 which synchronizes the output voltage phase of the interconnecting inverter 14 with the utility power voltage phase and monitors zero crossings of the utility power voltage, and which, when a predetermined number of zero crossings have been detected, shifts the output voltage phase from the utility power voltage phase during one cycle and shifts the shifted output voltage phase to the utility power voltage phase during the following cycle; a circuit breaker 22 for shutting off the output of the interconnecting inverter 14 from the utility power system 10; a phase comparator 24 for comparing the voltage phase of the utility power system 10 and the output voltage phase of the interconnecting inverter; and an interconnection control unit 30 which detects a power outage caused by an interruption of power supply from the utility power system 10 based on a series of a predetermined number of matching signals outputted from the phase comparator 24 and sends a control signal to the circuit breaker 22 to shut off the output of the interconnecting inverter 14 from the utility power system 10, and which sends a shutoff command to the turbogenerator 32 to stop the operation of the turbogenerator 32 after allowing the turbine 36 to rotate at the rated rotational speed for a predetermined period of time.

In the interconnecting power generation system configured in this way, the interconnection control unit 30 can detect a power outage caused by an interruption of power supply from the utility power system 10 based on a series of the predetermined number of matching signals outputted from the phase comparator 24 and send a control signal to the circuit breaker 22 to shut off the output of the interconnecting inverter 14 from the utility power system 10, and can send a shutoff command to the turbogenerator 32 to stop the operation of the turbogenerator 32 after allowing the turbine 36 to rotate at the rated rotational speed for the predetermined period of time.

To achieve the above object, according to a preferred embodiment of the third aspect, there is provided an, wherein, as shown for example in FIG. 1, the turbogenerator 32 recharges a battery 38 within the predetermined period of time in response to the shutoff command.

This application is based on the patent Application No. JP-2002-357778, filed on Dec. 10, 2002 in Japan, the content of which is incorporated herein, as part thereof.

Also, the invention can be fully understood, referring to the following description in details. Further extensive applications of the invention will be apparent from the following description in details. However, it should be noted that the detailed description and specific examples are preferred embodiments of the invention, only for the purpose of the description thereof. Because it is apparent for the person ordinary skilled in the art to modify and change in a variety of manners, within the scope and spirits of the invention. The applicant does not intend to dedicate any disclosed embodiments to the public, and to the extent any disclosed modifications or alterations may not literally fall within the scope of the claims, they are considered to be part of the invention under the doctrine of the equivalents.

DETAILED DESCRIPTION OF THE PREFERRED EMBODIMENTS

Figure 1:
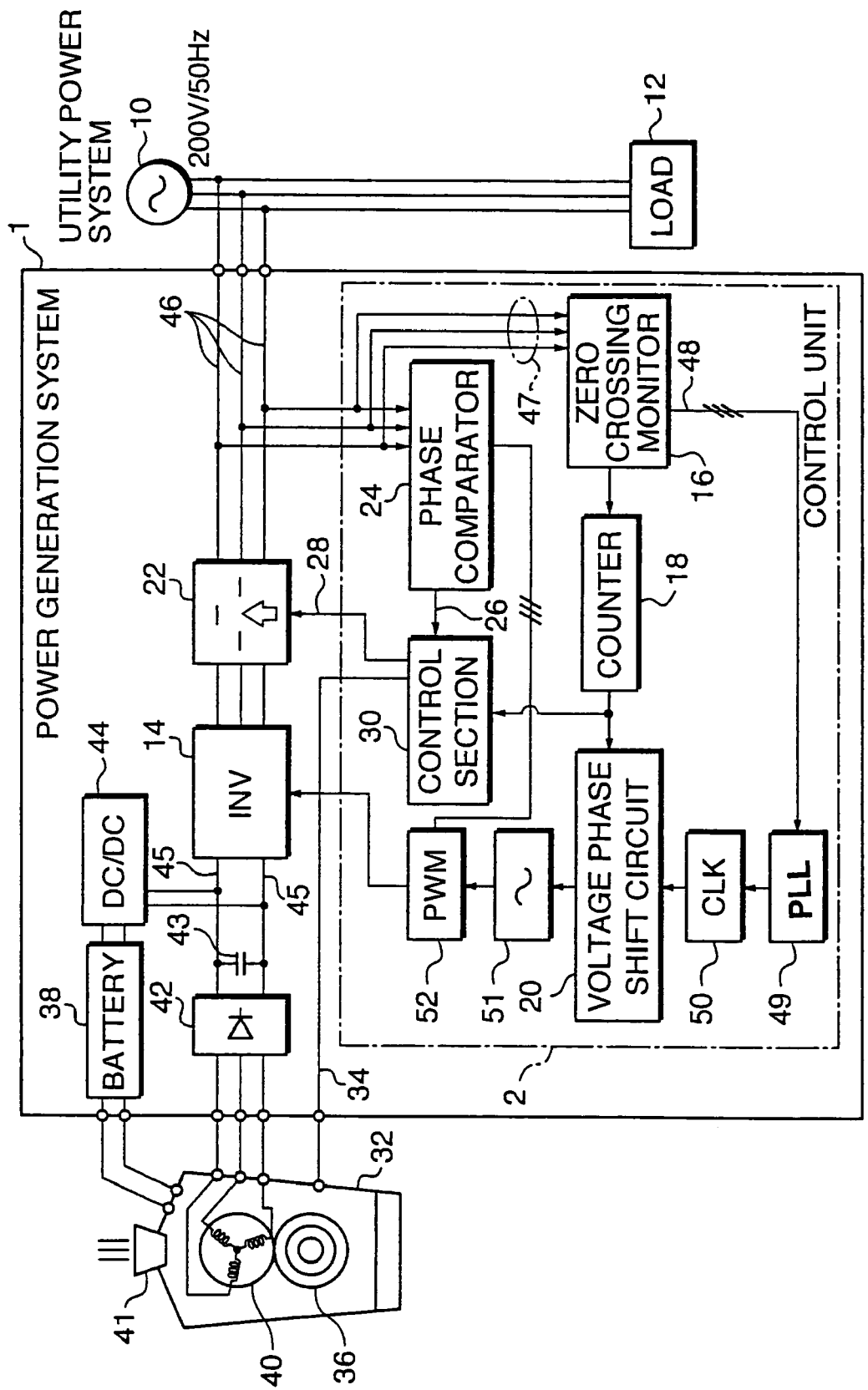
FIG. 1 is a block diagram of an interconnecting power generation system according to the first embodiment of the present invention.

Description will be hereinafter made of the embodiments of the present invention with reference to the illustrated examples. FIG. 1 through FIG. 6 are drawings for illustrating the embodiments for carrying out the invention. In the drawings, those sections with the same or similar reference numerals indicate the same or equivalent items and redundant descriptions are omitted.

FIG. 1 is a block diagram of an interconnecting power generation system according to a first embodiment of the present invention. An interconnecting power generation system 1 comprises a rectifier 42 connected to a stator winding 40 of a turbogenerator 32, an interconnecting inverter 14 connected to the rectifier 42 via a DC bus 45, a smoothing capacitor 43 connected in parallel to the DC bus 45, a battery 38 as electricity storage means connected to the DC bus 45 via a DC/DC converter 44 as DC voltage converting means, a circuit breaker 22 connected to the output of the interconnecting inverter 14, and a control unit 2 connected individually to the circuit breaker 22, an AC power line 46, the interconnecting inverter 14, and the turbogenerator 32 for controlling the interconnecting power generation system 1.

The control unit 2 comprises a phase comparator 24 connected to the AC power line 46, a zero crossing monitor 16 connected to the AC power line 46, a phase locked loop circuit (PLL) 49 as phase synchronization loop means connected to the zero crossing monitor 16, a clock circuit 50 connected to the PLL 49, a voltage phase shift circuit 20 connected to the zero crossing monitor 16 via a counter 18 and connected to the clock circuit 50, a sine wave generating circuit 51 connected to the voltage phase shift circuit 20, a pulse width modulation circuit 52 having an input connected to the sine wave generating circuit 51 and an output (or outputs) connected to the interconnecting inverter 14 and connected to the phase comparator 24, and a control section 30 as an interconnection control apparatus having an input connected to the phase comparator 24 and an output (or outputs) for outputting a circuit breaker control signal to the circuit breaker 22 through a line 28 and a turbine control command to the turbogenerator 32 through a line 34.

The turbogenerator 32 has a gas turbine 36 to which a permanent magnet rotor (connected to the turbogenerator 32) is commonly connected and which is rotated by combustion gas generated by burning fuel with air, a stator winding 40 surrounding the permanent magnet rotor connected to the gas turbine 36, and an exhaust port 41 for discharging the combustion gas.

Description will be made of the operation of the interconnecting power generation system 1 with reference to the block diagram of FIG. 1. The interconnecting power generation system 1 is connected in parallel to a utility power system 10 via the AC power line 46 and supplies AC electrical power with voltage and frequency of, for example, 400V/50 Hz, 200V/50 Hz, or 100V/50 Hz to an interconnecting load 12. It is needless to mention that the voltage and frequency of the AC electrical power can be adjusted to those of the electrical power supplied in the region where the interconnecting power generation system 1 is installed.

When the turbogenerator 32 receives a start command from the control section 30 through the line 34, DC electrical power is supplied from the battery 38 to a start inverter (not shown), which applies AC electrical power to the stator winding 40 to generate torque in the permanent magnet rotor to start the gas turbine 36.

When the supply of fuel and air and the ignition condition are controlled and the gas turbine 36 establishes self-operation, the start inverter is shut off from the stator winding 40 and supplies three-phase AC electrical power to the rectifier 42 connected to the stator winding 40.

The rectifier 42 supplies DC electrical power to the DC bus 45 connected to its output charging the smoothing capacitor 43 connected in parallel to the DC bus 45 to stabilize the potential of the DC bus 45. The rectifier 42 also supplies DC electrical power to the interconnecting inverter 14 through the DC bus 45. In this case, the DC electrical power supplied from the rectifier 42 may be boosted by a DC/DC converter (not shown) may be supplied to the interconnecting inverter 14.

The interconnecting inverter 14 has three pairs of IGBT (Insulated Gate Bipolar Transistor) switching transistors which are driven complementarily, and generates pulse-width-modulated sine wave AC voltage which follows the voltage phase of the utility power system 10 by switching on/off the DC voltage supplied from the DC bus 45 with a pulse width modulation (PWM) control signal.

The phase comparator 24 and the zero crossing monitor 16 are connected in parallel to the AC power line 46. When the circuit breaker 22 is on state (closed), the phase comparator 24 detects the voltage phase of the utility power system 10 which appears in the AC power line 46 and receives an output signal for driving the interconnecting inverter 14 from the pulse width modulation circuit 52. The phase comparator 24 compares the detected voltage phase of the utility power system 10 and the output signal from the interconnecting inverter 14 and compare the output voltage phase of the interconnecting inverter 14 and the voltage phase of the utility power system 10 in a pseudo manner. The comparison result and a voltage phase signal of the AC power line 46 are outputted to the control section 30 through a line 26.

The control section 30 controls the whole interconnecting power generation system 1. The control section 30 can prevent the interconnecting power generation system 1 from operating independently since the control section opens (shuts off) the circuit breaker 22 by sending a control signal to the circuit breaker 22 through the line 28 to isolate the interconnecting inverter 14 from the utility power system 10 when the voltage phase of the utility power system 10 is determined to have a frequency which exceeds or falls short of the frequency of the output voltage phase of the interconnecting inverter 14 by approximately 2% or greater based on the comparison result by the phase comparator 24.

For example, when no matching signal (or disagreement signal) is outputted from the phase comparator 24 within a period when the voltage phase of the utility power system 10 is to be matched with the output voltage phase of the interconnecting inverter 14 or when no matching signals (or disagreement signals) are outputted for a predetermined number of times in sequence, the control section 30 determines that the frequency of the voltage of the utility power system 10 is excessively high or low, and opens (shuts off) the circuit breaker 22 to isolate the interconnecting inverter 14 from the utility power system 10. The interconnecting power generation system 1 configured in this way can be thus isolated within at most several hundreds ms, preferably within 0.2 seconds.

When the circuit breaker 22 is on and the output voltage phase of the interconnecting inverter 14 is same with the voltage phase of the utility power system 10, the zero crossing monitor 16 monitors zero crossings of the voltage phase of the AC power line 46 via a line 47.

The zero crossing monitor 16 monitors the zero crossing timing at which the voltage waveform of the AC power line 46 passes a reference potential (ground potential) and outputs a zero crossing detection signal to the counter 18 every time it detects a zero crossing. Counting the zero crossing detection signals allows determining one cycle of the voltage waveform of the AC power line 46. For example, three zero crossing detection signals can be counted as one cycle of a sine wave voltage waveform.

The zero crossing monitor 16 sends a waveform signal to the PLL 49 through the line 48. The PLL 49 is an electronic circuit for making the frequency of an output signal to coincide with the frequency of an input signal or a reference frequency. For example, the PLL 49 detects the phase difference between the input signal and the output signal and generates a signal having a frequency accurately synchronized with the frequency of the input signal or the reference frequency by controlling a VCO (an oscillator that controls the frequency according to the voltage) or a loop of its internal circuit.

The voltage phase shift circuit 20 is configured to divide the frequency of the clock circuit 50 so that it can make the output voltage phase of the interconnecting inverter 14 coincide with the voltage phase of the utility power system 10 according to the output of the PLL 49. The voltage phase shift circuit 20 also receives a voltage phase shift signal from the counter 18 when it has counted a predetermined number of zero crossings or when it has counted a zero crossings after an internal timer (not shown) has reached a predetermined period of time. In response to the voltage phase shift signal, the voltage phase shift circuit 20 changes the frequency division ratio of the clock circuit 50 (delays or advances the phase of the clock), with the zero crossing timing as a starting point, and outputs a changed clock signal to the sine wave generating circuit 51.

The sine wave generating circuit 51 sends a sine wave with a shifted voltage phase to the pulse width modulation circuit 52. The pulse width modulation circuit 52 drives the interconnecting inverter 14 to shift the output voltage phase from the voltage phase of the utility power system 10.

For example, the voltage phase shift circuit 20 receives a voltage phase shift signal from the counter 18 every 100 ms and sets the frequency division ratio of the clock circuit 50 with the zero crossing timing as a starting point to cause a phase delay (minus phase shift) in response to the voltage phase shift signal. After the output voltage phase of the interconnecting inverter 14 has been shifted during one cycle, the voltage phase shift circuit 20 resets the frequency division ratio of the clock circuit 50 to cause a phase advance (plus phase shift) to return the output voltage phase to the initial state, whereby one phase shifting operation is completed.

When the utility power system 10 is normal during the frequency shifting operation, the impedance of the utility power system 10 is so low that changes in the output voltage phase of the interconnecting inverter 14 do not affect the voltage phase of the AC power line 46. Thus, the phase comparator 24 does not detect the shift in the voltage phase.

On the other hand, in case that the utility power system 10 is interrupted, even when the power outputted from the interconnecting inverter 14 and the power consumed by the interconnecting load 12 are balanced, including active power and reactive power, the shifted output voltage phase from the interconnecting inverter 14 appears as it is in the AC power line 46 with the interconnecting load 12. Thus, the control section 30 can compare the voltage phase received from the phase comparator 24 with the normal output voltage phase to detect a change in the voltage phase. In this case, the phase shift amount is determined based on the time difference in the zero crossing timing of the voltage phase.

Namely, the phase is shifted reliably for a period of two cycles of an advanced phase and a delayed phase, with the zero crossing timing as a starting point. Thus, when a power outage in the utility power system occurs, for example, in contrast to the case where the phase is shifted to be advanced only for one cycle, which may result in the phase not to be shifted if the phase is oppositely shifted to be delayed according to the load condition and may result in the inability to detect the power outage, the interconnection control unit 30 can detect the power outage irrespective of the load condition using the comparison result of the phases during the period of two cycles of the advanced phase and the delayed phase.

Thus, when the delayed or advanced voltage phase is detected during the period of two cycles, it is determined that the power supply is interrupted and a circuit breaker control signal is sent through the line 28 to open the circuit breaker 22, whereby the interconnecting power generation system 1 can be isolated from the utility power system 10. Thus, it is possible to prevent independent operation of the interconnecting power generation system 1.

Since the counter 18 outputs a voltage phase shift signal every 100 ms, it maybe determined that the power supply is interrupted when the delayed or advanced voltage phase appear during the period of two cycles are detected at least twice in a row. The interconnecting power generation system 1 can be isolated within at most several hundreds ms, preferably within 0.5 seconds in this way.

In the description above, the delayed or advanced voltage phase is detected during the period of two cycles. However, the phase difference may also be detected for a period of one half or full cycle (in this case, the phase difference can be detected during the cycle in which the phase is changed into the same direction as the direction of the phase change according to the load state predetermined or in which the phase change according to the load state is little, for example). Instead, an increase or decrease in the frequency which may occur during the period of two cycles may be detected for achieving the same effect. Although description has been made above of a method in which the phase is shifted over two cycles, it will be appreciated that another method may be used for achieving the same effect in which the phase is shifted over more than two cycles for the detection. The order of the advanced and delayed phases during the period of two cycles may be reversed.

Although the interconnecting power generation system is configured using a hardware logic as described above in this embodiment, the present invention is not limited to the above configuration. For example, the same effect can be obtained when the phase comparison, zero crossing monitoring, pulse width modulation and digital PLL are performed by software processing using a microcomputer or a digital signal processor and the processing operation is performed after converting the voltage phase of the AC power line 46 into a digital signal by an A/D converter (not shown).

When the control section 30 detects any one of an under-frequency or over-frequency condition or a power outage, the control section 30 sends a turbine control command through the line 34 to decrease the rotational speed of the gas turbine 36. Since the gas turbine 36 is operated at a rotational speed which is lower than the rated speed, the rotational speed of the gas turbine 36 does not increase to the absolute rated speed with the turbogenerator 32 at no-load condition even when the circuit breaker 22 is opened immediately after (approximately 0.2 to 0.5 seconds after) the detection to isolate the interconnecting power generation system 1 from the utility power system 10.

The control section 30 also sends a shutoff command to the turbogenerator 32 through the line 34 to control the rotational speed of the gas turbine 36 to be returned to the rated speed. Then, the control section 30 allows the gas turbine 36 to rotate at the rated speed for a predetermined period of time and then stops the operation of the turbogenerator 32. Since the rotational speed of the gas turbine 36, which have once increased because of the no-load operation, returns to the rated speed, the circuit breaker 22 can be closed (turned on) to link the interconnecting power generation system 1 with the utility power system 10 again when the normal power supply is restored after a short period of work during the power outage.

When the power outage continues and the work during the power outage continues until after the predetermined period of time has elapsed, the turbogenerator 32 is stopped leaving the circuit breaker 22 opened (turned off). Thus, the auxiliaries can be completely cooled down.

When the control section 30 detects any one of an over-frequency or under-frequency condition or a power outage, the control section 30 controls the battery 38 to be charged from the DC bus 45 through the DC/DC converter 44. The charging time of the battery 38 is preferably set to a period of any length by the time the turbogenerator 32 is stopped.

Figure 2:
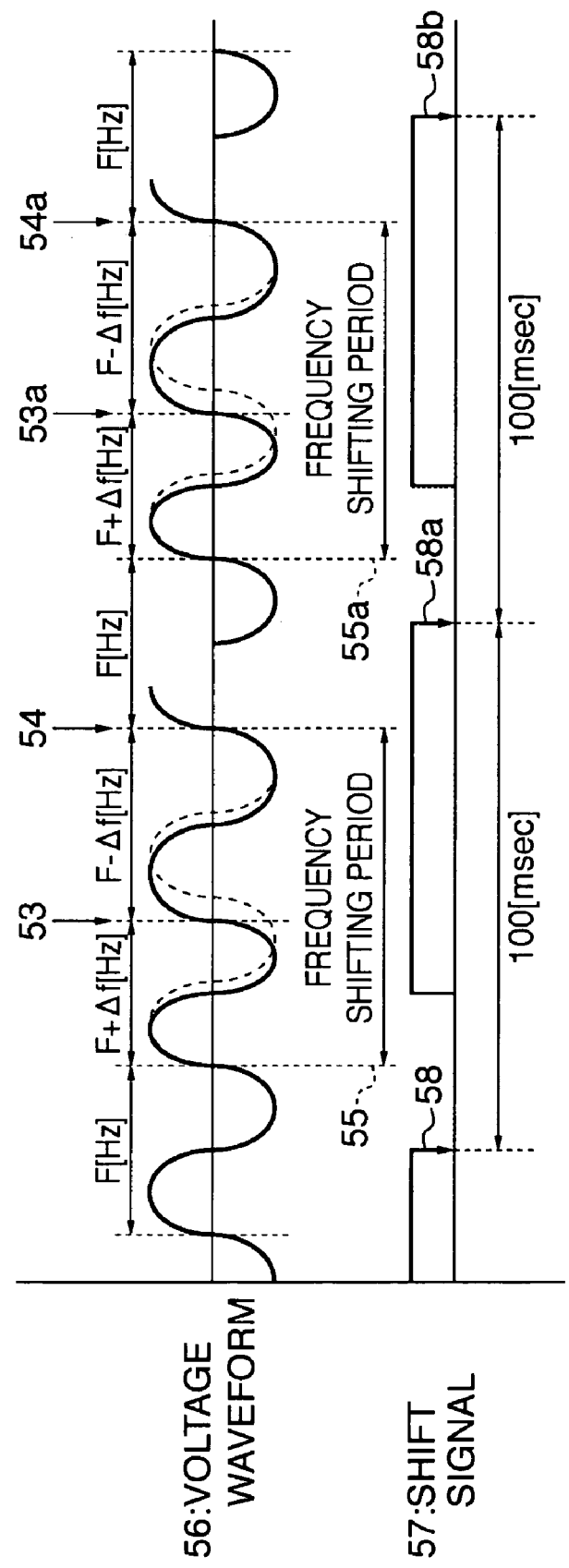
FIG. 2 is a waveform graph showing the output of the interconnecting power generation system according to the first embodiment of the present invention.

FIG. 2 is a waveform graph showing the output of the interconnecting power generation system 1 according to the first embodiment of the present invention. The interconnecting power generation system outputs a voltage waveform 56 from the interconnecting inverter to the AC power line 46. The voltage waveform 56 shown by a solid line in the graph indicates any one of three-phase AC outputs (u, v, w). The voltage waveform 56 shown by a broken line indicates a normal AC waveform (non-shifted waveform).

The control section 30 (see FIG. 1) receives a shift signal 57 from the counter 18 and monitors the comparison result between the phase of the voltage waveform from the interconnecting inverter 14 shown by a solid line and that of the utility power system voltage waveform shown by a broken line. The voltage phase shift circuit 20 (see FIG. 1) synchronizes the frequency F·Hz and phase of the voltage waveform 56 as the output of the interconnecting inverter 14 with the frequency and phase of the utility power voltage and monitors zero crossings of the utility power voltage. When a predetermined number of zero crossings, ten zero crossings in the case of 50 Hz, for example, are detected or when a zero crossing is detected after the internal timer has reached 100 ms, for example, with the zero crossing as a starting point, the voltage phase shift circuit 20 delays the output voltage phase of the voltage waveform 56 within one cycle (20 ms) (which results in the frequency thereof to be shifted from the frequency F of the utility power voltage to the frequency (F+Δf)). Then, the voltage phase shift circuit 20 advances the output voltage phase of the voltage waveform 56 within the next one cycle (20 ms) (which results in the frequency thereof to be shifted from the frequency F of the utility power voltage to the frequency (F−Δf)). In this way, the control section 30 can perform frequency shifting, which results from the phase shifting starting every 100 ms at the zero crossing point. The period of two cycles starting at the zero crossing point, during which the phase of the voltage waveform is changed, will be referred to as frequency shifting period.

The illustrated voltage waveform 56 is synchronized with the frequency F of the utility power voltage except for the frequency shifting period. A frequency shifting period is started at a zero crossing point 55 which appears immediately after the falling edge 58 of the shift signal 57 and the frequency of the voltage waveform 56 is increased by Δf (Hz). During the frequency shifting period, the shift signal 57 is activated and a zero crossing point 53 which appears one cycle after the zero crossing point 55 is detected, and data on the shifted waveform with the increased frequency is captured. Since the voltage waveform 56 shown by a solid line is advanced in phase with respect to the normal voltage waveform shown by a broken line, the utility power system 10 is interrupted and the AC power line 46 is also interrupted. When the phase shift of the zero crossing point 53 is detected, the control unit 2 can control the circuit breaker 22 to be opened.

Then, the frequency of the voltage waveform 56 is decreased by Δf (Hz) at the zero crossing point 53 to return it to the normal frequency F. A zero crossing point 54 which appears one cycle after the zero crossing point 53 is detected and data on the shifted waveform with the decreased frequency is captured. The frequency F of the voltage waveform 56 at this point of time is synchronized with the utility frequency.

A frequency shifting period as described above is started again in response to a falling edge 58a which deactivates the shift signal 57, which has been activated, 100 ms after the falling edge 58 of the shift signal 57. Likewise, data on the shifted waveform with the increased frequency is captured at a zero crossing point 53a to detect a power outage in the AC power line 46. In this embodiment, the circuit breaker 22 may be opened not at the first detection of the power outage but in response to the second detection of the power outage. By detecting power outages in sequence as described above, there can be provided an interconnecting power generation system with high reliability which can avoid independent operation.

Then, in order to return the frequency of the voltage waveform 56 to the normal frequency F, the frequency of the voltage waveform 56 is decreased by Δf (Hz) at the zero crossing point 53a. A zero crossing point 54a which appears one cycle after the zero crossing point 53a is detected and data on the shifted waveform with the decreased frequency is captured. The frequency F of the voltage waveform 56 at this point of time is synchronized with the utility frequency. Then, a frequency shifting period can be started in response to a falling edge 58b of the shift signal 57 100 ms after the falling edge 58a.

Although the voltage waveform 56 has been described above as a waveform at the time of a power outage shown by a solid line, when the utility power system 10 is normally supplying electrical power, the frequency of the voltage waveform 56 in the AC power line 46 is changed to the frequency of the voltage waveform shown by a broken line even if a shifted voltage waveform is outputted from the interconnecting inverter 14.

Figure 3:
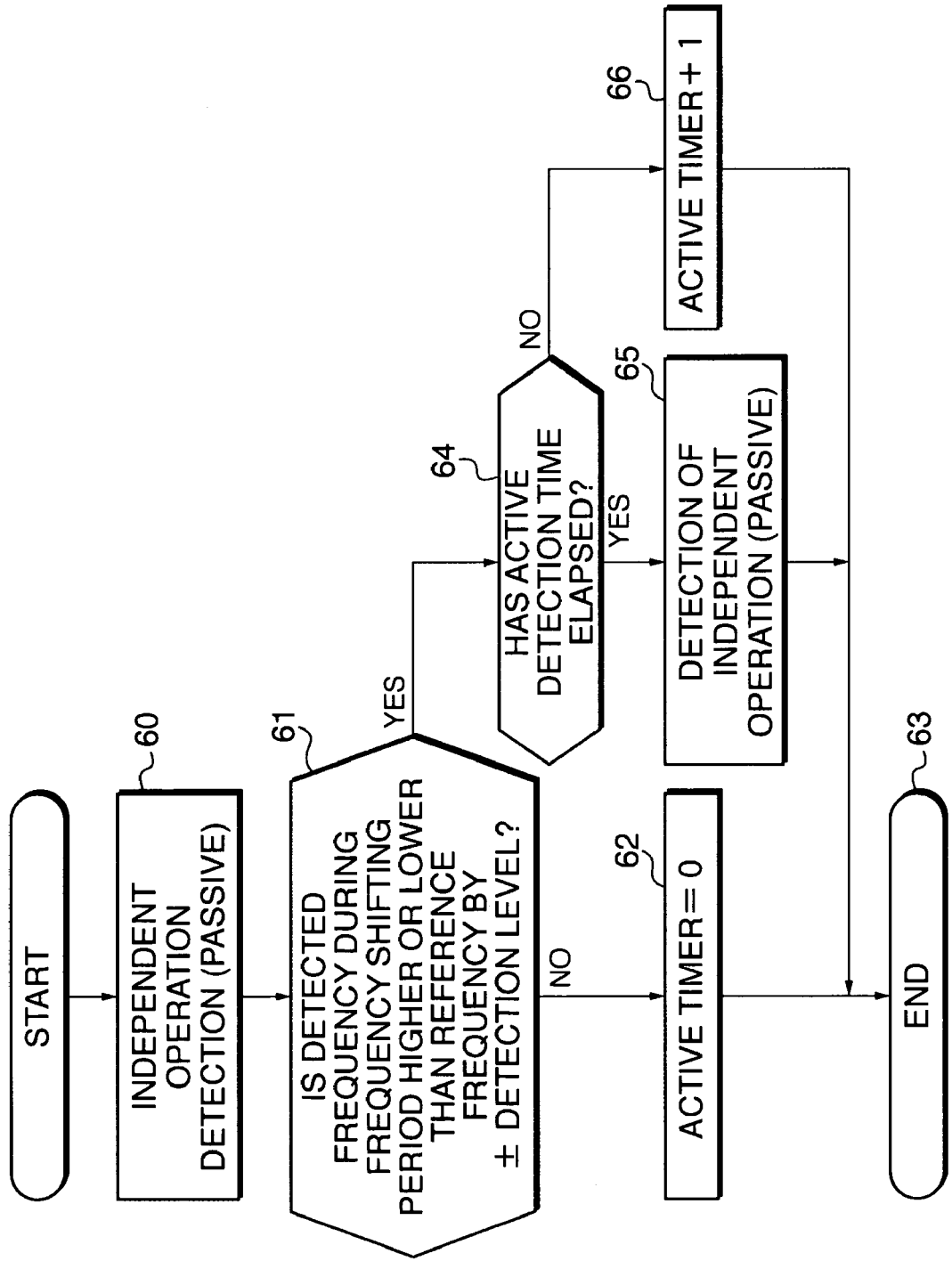
FIG. 3 is a flowchart illustrating passive independent operation detection of the interconnecting power generation system according to the first embodiment of the present invention.

FIG. 3 is a flowchart illustrating passive independent operation detection of the interconnecting power generation system according to the first embodiment of the present invention. When proceeding from the start step to the step 60, the interconnecting power generation system performs passive independent operation detection. When completing the independent operation detection, the process proceeds to the step 61, where the interconnecting power generation system performs active independent operation detection. At the step 61, it is determined whether the detected frequency of the voltage which appears in the AC power line 46 during the frequency shifting period is higher or lower than the reference frequency. For example, when the utility frequency is 50 Hz and the frequency shift amount is set to 1 Hz, an over-frequency or under-frequency can be detected with a detection level of ±2%.

If the determined result is negative (NO), the process proceeds to the step 62, where an active timer is initialized (reset to zero). Then, the process proceeds to the step 63, where the process is ended. If the determined result is positive (YES), the process proceeds to the step 64, where it is determined whether or not an active detection time has elapsed.

When the detection time has elapsed, namely when the determined result is positive (YES), the process proceeds to the step 65, where passive independent operation is detected and the circuit breaker 22 is opened. Then, the process proceeds to the step 63, where the process is ended. When the determined result is negative (NO) at the step 64, the process proceeds to the step 66, where the active timer is incremented. Then, the process proceeds to the step 63, where the process is ended.

By repeating the passive independent operation detection process described above, an over frequency or an under frequency can be detected at any times with a detection level of ±2%. When the detection level of the frequency shift is set to ½ of the shift frequency, for example, when the frequency of the utility power system 10 is 50 Hz and the frequency shift amount is set to 1 Hz, a frequency shift is detected when the frequency is 50.5 Hz or higher at the time when the frequency is increased. Also under the same conditions, a frequency shift is detected when the frequency is 49.5 Hz or lower at the time when the frequency is decreased.

Figure 4:
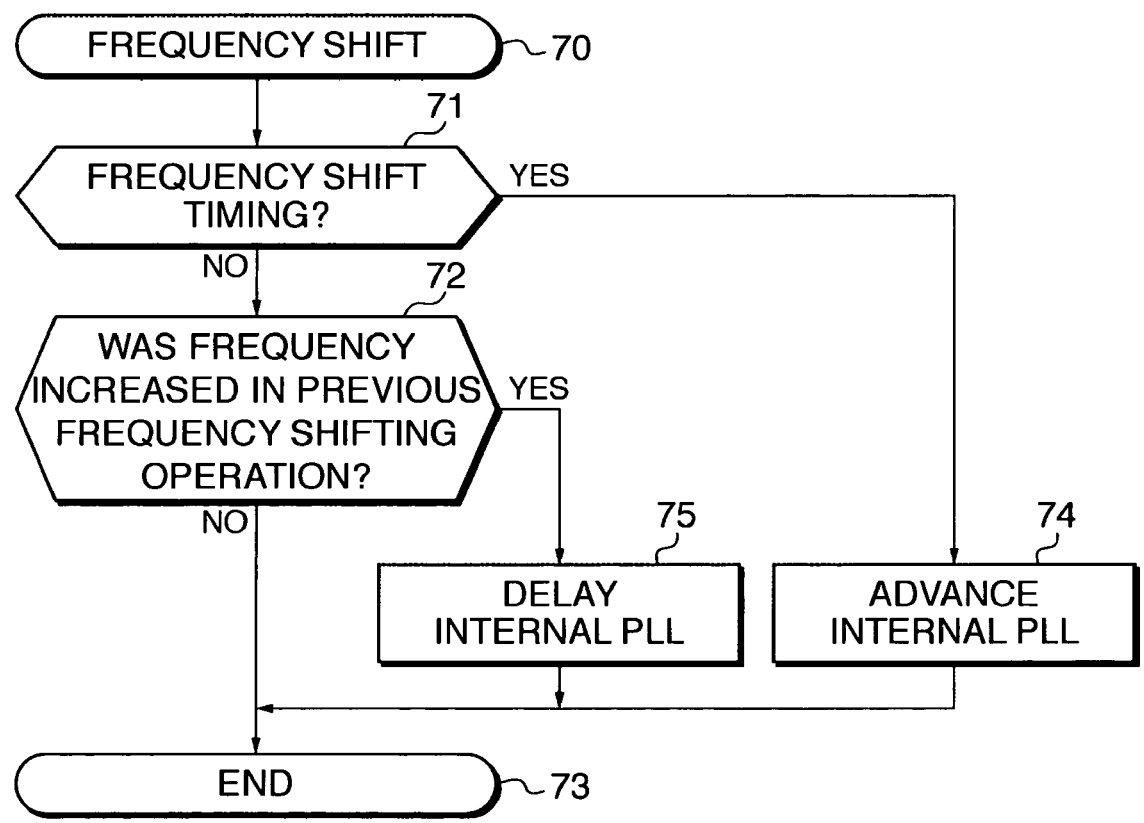
FIG. 4 is a flowchart illustrating active independent operation detection of the interconnecting power generation system according to the first embodiment of the present invention.

FIG. 4 is a flowchart illustrating active independent operation detection of the interconnecting power generation system according to the first embodiment of the present invention. The interconnecting power generation system starts active independent operation detection in the step 70. Then, the process proceeds to the step 71, where it is determined whether or not it is during the frequency shifting period.

If the determined result is positive (YES), the process proceeds to the step 74, where the internal PLL is advanced to increase the frequency. Then, the process proceeds to the step 73, where the process is ended. If the determined result is negative (NO), the process proceeds to the step 72, where it is determined whether or not the frequency was increased (plus shift) in the previous frequency shifting operation. If the determined result is positive (YES), the process proceeds to the step 75, where the internal PLL is delayed to decrease the frequency. Then, the process proceeds to the step 73, where the process is ended. When the determined result is negative (NO) at the step 72, the process proceeds to the step 73, where the process is ended.

The active independent operation detection process is repeated to shift the frequency at intervals of about 100 ms. The voltage waveform which appears in the AC power line 46 is monitored so that a power outage in the utility power system 10 can be detected.

Figure 5:
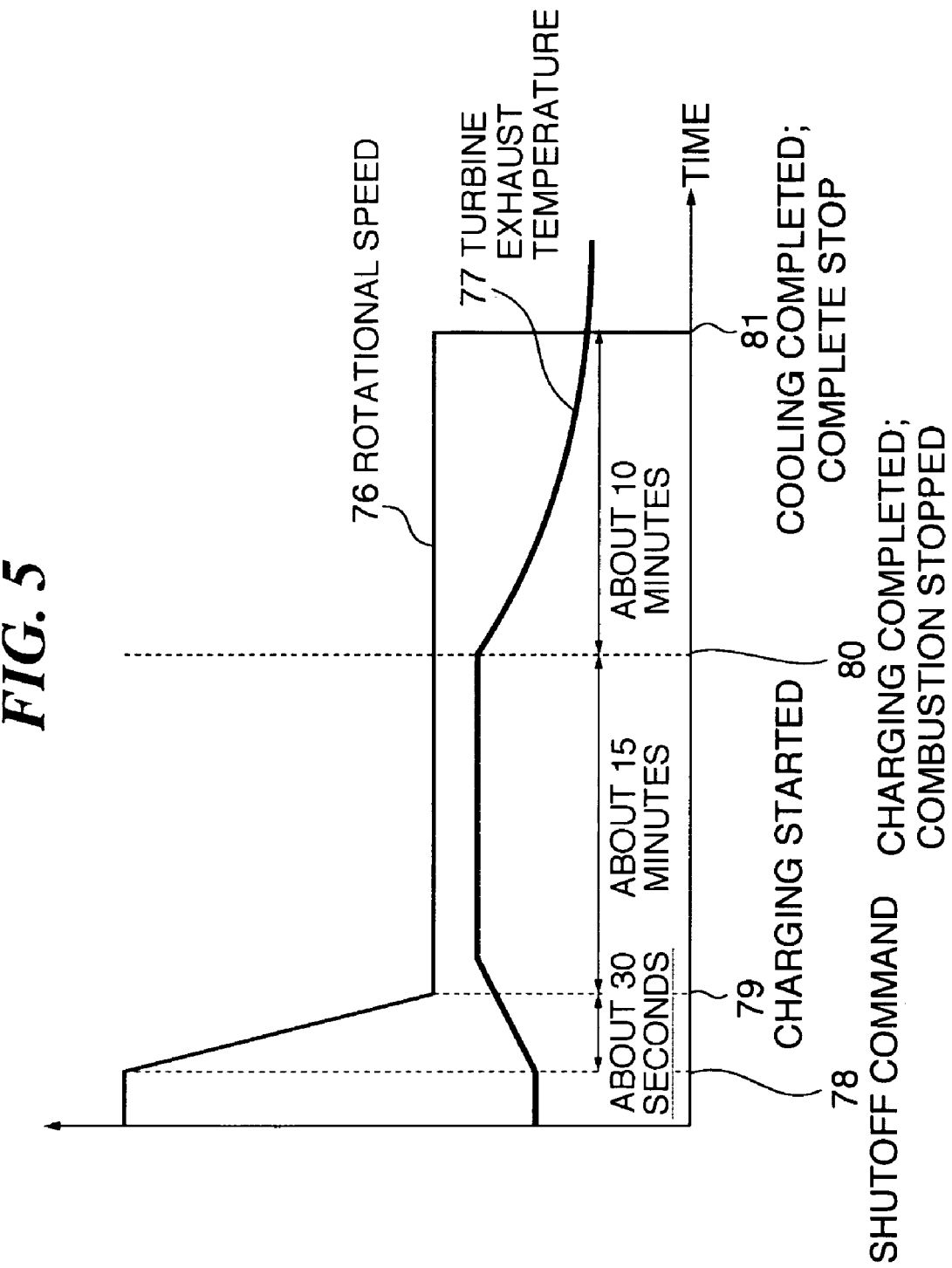
FIG. 5 is a graph for illustrating the operation of the interconnecting power generation system according to the second embodiment of the present invention.

FIG. 5 is a graph for illustrating the operation of an interconnecting power generation system according to a second embodiment of the present invention. In the interconnecting power generation system, when the control section 30 sends a shutoff command 78 to open the circuit breaker 22, the turbogenerator 32 decreases the supply of fuel and air to decrease the rotational speed 76 of the gas turbine 36 within 30 seconds from the rated rotational speed to a low rotational speed in preparation for stopping it.

The control section 30 sends a charging start command 79 for controlling the DC/DC converter 44 to charge the battery 38. While the gas turbine 36 is rotating at the decreased speed, the charging of the battery 38 is complete (80) within about 15 minutes. Then, the control section 30 stops the supply of fuel and air to the gas turbine 36 to stop the combustion in the gas turbine 36.

Cooling of the auxiliaries and circulating oil is complete (81) about 10 minutes after the battery charging has been complete (80), and the gas turbine 36 can be stopped completely. When the shutoff command 78 is outputted, the turbine exhaust temperature 77 is the rated value. Then the rotational speed of the gas turbine 36 decreases in response to the shutoff command 78 to increase the turbine exhaust temperature 77, but the increased temperature is still within a permissible value. Then the combustion in the gas turbine 36 is stopped and the turbine exhaust temperature 77 gradually decreases and the cooling is complete (81).

Figure 6:
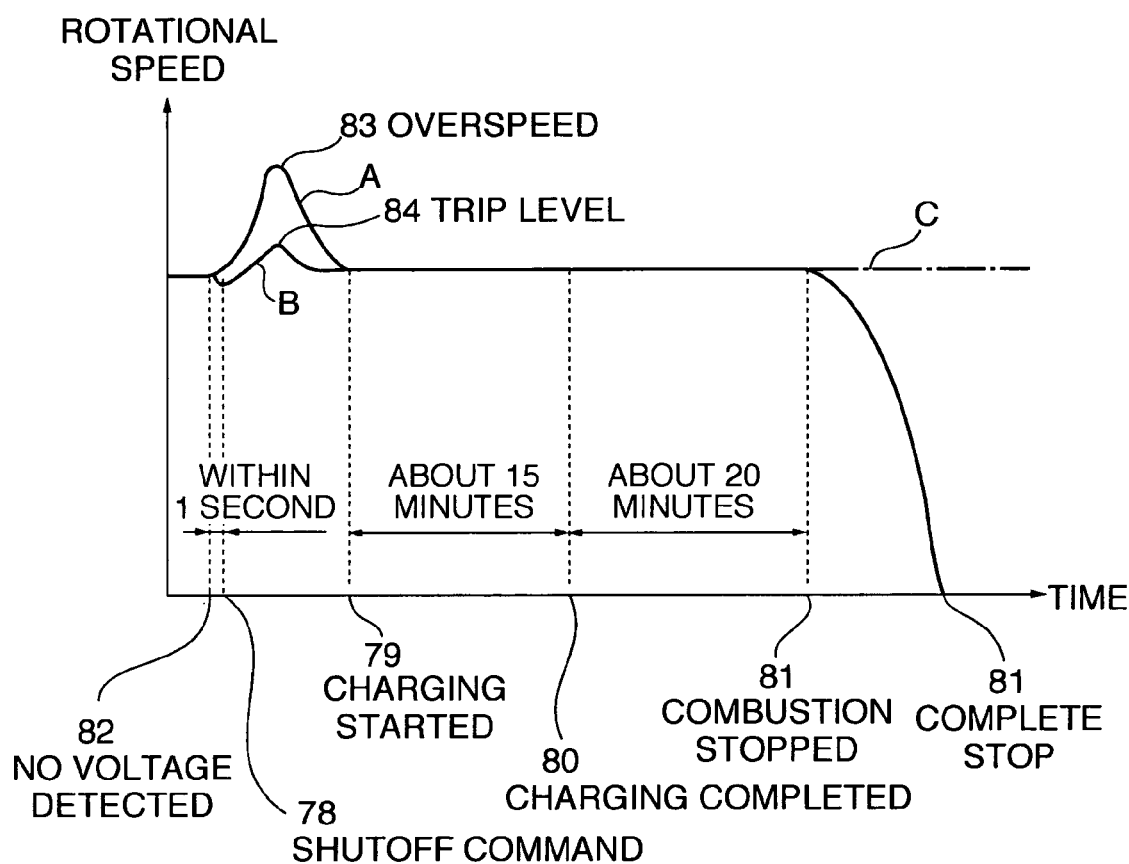
FIG. 6 is a graph for illustrating the operation of the interconnecting power generation system according to the third embodiment of the present invention.

FIG. 6 is a graph for illustrating the operation of an interconnecting power generation system according to a third embodiment of the present invention. The interconnecting power generation system sends a turbine deceleration command to the turbogenerator 32 when the control section 30 has detected a power outage (82). The turbogenerator 32 decreases the supply of fuel and air to decelerate the gas turbine 36 to a lower rotational speed than its rated speed.

The control section 30 sends a shutoff command 78 within about 1 second after the power outage detection (82) to open the circuit breaker 22 isolating the interconnecting power generation system from the utility power system 10. Since the turbogenerator 32 is put into a no-load operating condition by the isolation, the rotational speed of the gas turbine 36 increases to a trip level 84 as indicated by B. However, the rotational speed does not reach an overspeed 83, such as when the isolation is made when the gas turbine 36 is operating at the rated speed as indicated by A because of lower rotational speed of the gas turbine 36.

The turbogenerator 32 controls the supply of fuel and air to return the rotational speed of the gas turbine 36 from the trip level 84 to its rated speed. After the rotational speed of the gas turbine 36 has been returned to the rated speed, charging of the battery 38 is started (79). The charging of the battery 38 is complete in about 15 minutes (80).

In this embodiment, the turbogenerator 32 is operated for about another 20 minutes, during which the voltage of the AC power line 46 is monitored to detect power restoration of the utility power system 10. When the power outage continues for 20 minutes or longer, the combustion in the gas turbine 36 is stopped (81) and the turbine speed is gradually decreased until the turbogenerator stops completely (81).

When power restoration of the utility power system 10 is detected after the charging of the battery 38 has been completed (80) as shown by the dot-dash line C, rated operation is continued and the interconnecting power generation system 1 and the utility power system 10 can be reconnected by synchronizing the frequency of output from the interconnecting power generation system 1 with that of the utility power system 10 and closing the circuit breaker 22. The reason why the gas turbine 36 is operated continuously is to prevent the gas turbine 36 from starting and stopping frequently.

Thereby, the interconnecting power generation system can avoid independent operation by detecting an abnormality in the utility power system 10 and can prevent damage to and deterioration of the turbogenerator 32.

The interconnecting power generation system of the present invention is not limited by the above examples illustrated in the drawings, and it will be appreciated that variations and modifications may be made without departing from the spirit and scope of the present invention.

As has been described above, according to the invention of claims 1 to 6, there is provided an interconnecting power generation system which can detect an abnormality in the utility power supply and can be isolated from the utility power a system and can prevent damage to a turbogenerator.

What is claimed is:

1. An interconnecting power generation system connected in parallel to a utility power system for supplying electrical power to an interconnecting load, comprising:

an interconnecting inverter for linking generated electrical power to said utility power system;

a voltage phase shift circuit which synchronizes the output voltage phase of said interconnecting inverter with the utility power voltage phase and monitors zero crossings of said utility power voltage, and which, when a predetermined number of zero crossings have been detected, to detect a power outage actively, shifts said output voltage phase from said utility power voltage phase during one cycle and shifts the shifted output voltage phase to said utility power voltage phase during the following cycle;

a circuit breaker for shutting off the output of said interconnecting inverter from said utility power system;

a phase comparator for comparing the voltage phase of said utility power system and said output voltage phase of said interconnecting inverter; and an interconnection control unit which detects a power outage caused by an interruption of power supply from said utility power system based on a series of a predetermined number of matching signals outputted from said phase comparator and sends a control signal to said circuit breaker to shut off the output of said interconnecting inverter from said utility power system.

2. An interconnecting power generation system connected in parallel to a utility power system for supplying electrical power to an interconnecting load, comprising:

an interconnecting inverter for linking generated electrical power to said utility power system;

a voltage phase shift circuit which synchronizes the output voltage phase of said interconnecting inverter with the utility power voltage phase and monitors zero crossings of said utility power voltage, and which, when a predetermined number of zero crossings have been detected, shifts said output voltage phase from said utility power voltage phase during one cycle and shifts the shifted output voltage phase to said utility power voltage phase during the following cycle;

a circuit breaker for shutting off the output of said interconnecting inverter from said utility power system;

a phase comparator for comparing the voltage phase of said utility power system and said output voltage phase of said interconnecting inverter; and an interconnection control unit which detects a power outage caused by an interruption of power supply from said utility power system based on a series of a predetermined number of matching signals outputted from said phase comparator and sends a control signal to said circuit breaker to shut off the output of said interconnecting inverter from said utility power system;

wherein, when no matching signal is outputted from said phase comparator within a period during which said output voltage phase is to be matched with said utility power voltage phase, said interconnection control unit detects variations in the frequency of said utility power system and sends a control signal to said circuit breaker to shut off the output of said interconnecting inverter from said utility power system.

3. An interconnecting power generation system connected in parallel to a utility power system and for supplying electrical power to an interconnecting load, comprising:

a turbogenerator for generating electrical power, an interconnecting inverter for linking electrical power generated by said turbogenerator to said utility power system;

a voltage phase shift circuit which synchronizes the output voltage phase of said interconnecting inverter with the utility power voltage phase and monitors zero crossings of said utility power voltage, and which, when a predetermined number of zero crossings have been detected, shifts said output voltage phase from said utility power voltage phase during one cycle and shifts the shifted output voltage phase to said utility power voltage phase during the following cycle;

a circuit breaker for shutting off the output of said interconnecting inverter from said utility power system;

a phase comparator for comparing the voltage phase of said utility power system and said output voltage phase of said interconnecting inverter; and an interconnection control unit which detects a power outage caused by an interruption of power supply from said utility power system based on a series of a predetermined number of matching signals outputted from said phase comparator and sends a control signal to said circuit breaker to shut off the output of said interconnecting inverter from said utility power system, and which decreases the rotational speed of said turbogenerator to a predetermined speed during the period between the detection of said power outage and the shutoff of said utility power system.

4. The interconnecting power generation system according to claim 3, wherein said turbogenerator recharges a battery within said predetermined period of time in response to said shutoff command.

5. An interconnecting power generation system connected in parallel to a utility power system and for supplying electrical power to an interconnecting load, comprising:

a turbogenerator for generating electrical power, an interconnecting inverter for linking electrical power generated by said turbogenerator to said utility power system;

a voltage phase shift circuit which synchronizes the output voltage phase of said interconnecting inverter with the utility power voltage phase and monitors zero crossings of said utility power voltage, and which, when a predetermined number of zero crossings have been detected, shifts said output voltage phase from said utility power voltage phase during one cycle and shifts the shifted output voltage phase to said utility power voltage phase during the following cycle;

a circuit breaker for shutting off the output of said interconnecting inverter from said utility power system;

a phase comparator for comparing the voltage phase of said utility power system and said output voltage phase of said interconnecting inverter; and an interconnection control unit which detects a power outage caused by an interruption of power supply from said utility power system based on a series of a predetermined number of matching signals outputted from said phase comparator and sends a control signal to said circuit breaker to shut off the output of said interconnecting inverter from said utility power system, and sends a shutoff command to said turbogenerator to stop the operation of said turbogenerator after allowing the turbine to rotate at the rated rotational speed for a predetermined period of time.

6. The interconnecting power generation system according to claim 5, wherein said turbogenerator recharges a battery within said predetermined period of time in response to said shutoff command.

* * * * *

UNITED STATES PATENT AND TRADEMARK OFFICE
CERTIFICATE OF CORRECTION

PATENT NO. : 7,233,082 B2
APPLICATION NO. : 10/731879
DATED : June 19, 2007
INVENTOR(S) : Furuya et al.

Page 1 of 1

It is certified that error appears in the above-identified patent and that said Letters Patent is hereby corrected as shown below:

<u>On Title Page</u>, Item (73) Assignee: "Ebara Densan Ltd., Tokyo (JP)" should read
-- Ebara Corporation, Tokyo (JP) and Ebara Densan Ltd., Tokyo (JP) --

Signed and Sealed this

Eighth Day of April, 2008

JON W. DUDAS
*Director of the United States Patent and Trademark Office*